United States Patent
Sinha et al.

(10) Patent No.: US 12,001,449 B2
(45) Date of Patent: *Jun. 4, 2024

(54) REPLICATION OF INVENTORY DATA ACROSS MULTIPLE SOFTWARE-DEFINED DATA CENTERS

(71) Applicant: VMWARE, INC., Palo Alto, CA (US)

(72) Inventors: Kundan Sinha, Bangalore (IN); Shalini Krishna, Bangalore (IN)

(73) Assignee: VMware LLC, Palo Alto, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/591,613

(22) Filed: Feb. 3, 2022

(65) Prior Publication Data

US 2023/0177067 A1 Jun. 8, 2023

(30) Foreign Application Priority Data

Dec. 7, 2021 (IN) .............................. 202141056771

(51) Int. Cl.
| | |
|---|---|
| *G06F 16/27* | (2019.01) |
| *G06F 11/14* | (2006.01) |
| *G06F 16/25* | (2019.01) |
| *G06Q 10/087* | (2023.01) |

(52) U.S. Cl.
CPC .............. *G06F 16/27* (2019.01); *G06F 11/14* (2013.01); *G06F 16/256* (2019.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 2007/0206368 | A1* | 9/2007 | Zhang | H05K 7/1408 361/801 |
| 2009/0083342 | A1* | 3/2009 | Tomic | G06F 16/1844 |
| 2014/0173065 | A1* | 6/2014 | Sears | H04L 41/145 709/221 |
| 2018/0365271 | A1* | 12/2018 | Castaing | G06F 16/275 |
| 2020/0241910 | A1* | 7/2020 | Verma | G06F 9/5044 |

OTHER PUBLICATIONS

VMware, Inc. "vCenter Server Installation and Setup," Update 2, VMware vSphere 6.7, vCenter Server 6.7, Apr. 2, 2021, 208 pages.

* cited by examiner

*Primary Examiner* — Amresh Singh
(74) *Attorney, Agent, or Firm* — Kim & Stewart LLP

(57) ABSTRACT

A method of managing the sharing of inventory data across a plurality of data centers, includes the steps of detecting a change made to the inventory data by one of the data centers, updating a desired state document that specifies a desired state of each of the data centers, the updated desired state document including the inventory data as changed, and instructing each of other ones of the data centers to update the inventory data using the updated desired state document. Each of the data centers employ a database for storing the inventory data, and so after the remaining ones of the data centers have updated the inventory data using the updated desired state document, the change made to the inventory data stored in the database of one of the data centers is replicated in the respective databases of the remaining ones of the data centers.

19 Claims, 4 Drawing Sheets

```
{
  "sddc_id": "SDDC_UUID",
  "vcenter": {
    "datacenters": [{
      "name": "SDDC-Datacenter",
      "clusters": [{
        "name": "Cluster1",
        "hosts": [{
          "name": "10.2.32.4",
          "connection": {},
          "vsan": {},
          "network": {}
        }, {
          "name": "10.2.32.5",
          "connection": {},
          "vsan": {},
          "network": {}
        }],
        "drs": {},
        "high_availability": {},
        "resource_pools": []
      }]
    }]
  },
  "ESXi": {},
  "vSAN": {},
  "NSX": {}, "inventory":{
    "users": [],
    "tags": [],
    "services": [],
    "credentials": []
  }
}
```

FIGURE 2

REPLICATION OF INVENTORY DATA ACROSS MULTIPLE SOFTWARE-DEFINED DATA CENTERS

RELATED APPLICATION

Benefit is claimed under 35 U.S.C. 119(a)-(d) to Foreign Application Serial No. 202141056771 filed in India entitled "REPLICATION OF INVENTORY DATA ACROSS MULTIPLE SOFTWARE-DEFINED DATA CENTERS", on Dec. 7, 2021, by VMware, Inc., which is herein incorporated in its entirety by reference for all purposes.

BACKGROUND

In a software-defined data center (SDDC), virtual infrastructure, which includes virtual compute, storage, and networking resources, is provisioned from hardware infrastructure that includes a plurality of host computers, storage devices, and networking devices. The provisioning of the virtual infrastructure is carried out by management software that communicates with virtualization software (e.g., hypervisor) installed in the host computers.

As described in U.S. patent application Ser. No. 17/464,733, filed on Sep. 2, 2021, the entire contents of which are incorporated by reference herein, the desired state of the SDDC, which specifies the configuration of the SDDC (e.g., number of clusters, hosts that each cluster would manage, and whether or not certain features, such as distributed resource scheduling, high availability, and workload control plane, are enabled), may be defined in a declarative document, and the SDDC is deployed or upgraded according to the desired state defined in the declarative document.

The declarative approach has simplified the deployment and upgrading of the SDDC configuration, but may still be insufficient by itself to meet the needs of customers who have multiple SDDCs deployed across different geographical regions, and deployed in a hybrid manner, e.g., on-premise, in a public cloud, or as a service. These customers want to ensure that all of their SDDCs are compliant with company policies, and are looking for an easier way to: (1) monitor their SDDCs for compliance with the company policies; (2) manage the upgrade and remediation of such SDDCs; and (3) view and manage inventories of such SDDCs.

SUMMARY

A method of managing the sharing of inventory data across a plurality of data centers, includes the steps of detecting a change made to the inventory data by one of the data centers, updating a desired state document that specifies a desired state of each of the data centers, the updated desired state document including the inventory data as changed, and instructing each of other ones of the data centers to update the inventory data using the updated desired state document. Each of the data centers employ a database for storing the inventory data, and so after the remaining ones of the data centers have updated the inventory data using the updated desired state document, the change made to the inventory data stored in the database of one of the data centers is replicated in the respective databases of the remaining ones of the data centers.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 2 illustrates a condensed version of a sample desired state document that includes fields for inventory data.

DETAILED DESCRIPTION

One or more embodiments employ a cloud control plane for managing the configuration and inventory data of SDDCs, which may be of different types and which may be deployed across different geographical regions, according to a desired state of the SDDC defined in a declarative document referred to herein as a desired state document. In the embodiment illustrated herein, the desired state document is created in the form of a human readable and editable file, e.g., a JSON (JavaScript Object Notation) file. The cloud control plane is responsible for generating the desired state and specifying operations to be carried out in the SDDCs according to the desired state. Thereafter, configuration agents running locally in the SDDCs establish cloud inbound connections with the cloud control plane to acquire the desired state and the operations to be carried out, and delegate the execution of these operations to services running in a local SDDC control plane.

Figure 1:
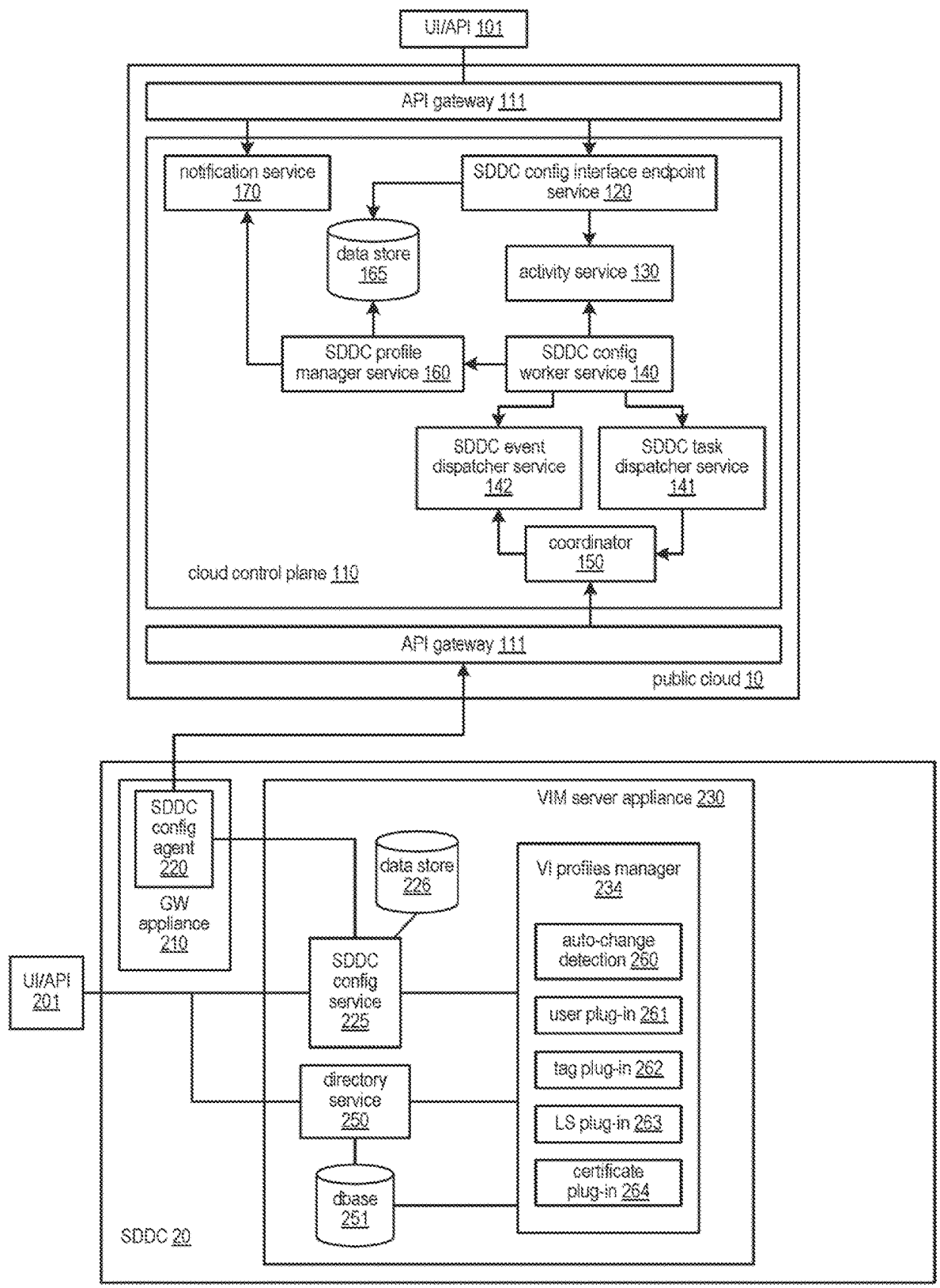
FIG. 1 depicts a cloud control plane implemented in a public cloud, and a plurality of SDDCs that are managed through the cloud control plane, according to embodiments.

FIG. 1 depicts a cloud control plane 110 implemented in a public cloud 10, and a plurality of SDDCs 20 that are managed through cloud control plane 110. In the embodiment illustrated herein, cloud control plane 110 is accessible by multiple tenants through UI/API 101 and each of the different tenants manage a group of SDDCs through cloud control plane 110 according to a desired state of the SDDCs that the tenant defines in a desired state document. In the following description, a group of SDDCs of one particular tenant is depicted as SDDCs 20, and to simplify the description, the operation of cloud control plane 110 will be described with respect to management of SDDCs 20. However, it should be understood that the SDDCs of other tenants have the same appliances, software products, and services running therein as SDDCs 20, and are managed through cloud control plane 110 in the same manner as described below for SDDCs 20.

A user interface (UI) or an application programming interface (API) that interacts with cloud control plane 110 is depicted in FIG. 1 as UI/API 101. Through UI/API 101, an administrator of SDDCs 20 can issue commands to: (1) get the desired state or the running state of any of SDDCs 20; (2) create the desired state of SDDCs 20, e.g., by specifying a location of the desired state document or specifying the running state of one of SDDCs 20 to be used as the desired state of all SDDCs 20; (3) perform a compliance check of SDDCs against the desired state; and (4) apply the desired state to SDDCs 20.

Cloud control plane 110 represents a group of services running in virtual infrastructure of public cloud 10 that interact with each other to provide a control plane through which the administrator of SDDCs 20 can manage the desired state of SDDCs 20 by issuing commands through UI/API 101. API gateway 111 is also a service running in the virtual infrastructure of public cloud 10 and this service is responsible for routing cloud inbound connections to the proper service in cloud control plane 110, e.g., SDDC configuration interface endpoint service 120, notification service 170, or coordinator 150.

SDDC configuration interface endpoint service 120 is responsible for accepting commands made through UI/API 101 and returning the result to UI/API 101. An operation requested in the commands can be either synchronous or asynchronous. Asynchronous operations are stored in activity service 130, which keeps track of the progress of the operation, and an activity ID, which can be used to poll for the result of the operation, is returned to UI/API 101. If the operation targets multiple SDDCs 20 (e.g., an operation to apply the desired state to SDDCs 20), SDDC configuration interface endpoint service 120 creates an activity which has children activities. SDDC configuration worker service 140 processes these children activities independently and respectively for multiple SDDCs 20, and activity service 130 tracks these children activities according to results returned by SDDC configuration worker service 140.

SDDC configuration worker service 140 polls activity service 130 for new operations and processes them by passing the tasks to be executed to SDDC task dispatcher service 141. SDDC configuration worker service 140 then polls SDDC task dispatcher service 141 for results and notifies activity service 130 of the results. SDDC configuration worker service 140 also polls SDDC event dispatcher service 142 for events posted to SDDC event dispatcher service 142 and handles these events based on the event type. Examples of events posted to SDDC event dispatcher service 142 include a change event, where "a local change has been made to the desired state of an SDDC," and a drift event, where "the running state of SDDC is out of compliance with its desired state."

SDDC task dispatcher service 141 dispatches each task passed thereto by SDDC configuration worker service 140, to coordinator 150 and tracks the progress of the task by polling coordinator 150. Coordinator 150 accepts cloud inbound connections, which are routed through API gateway 111, from SDDC configuration agents 220. SDDC configuration agents 220 are responsible for establishing cloud inbound connections with coordinator 150 to acquire tasks routed to coordinator 150 for execution in their respective SDDCs 20, and orchestrating the execution of these tasks. Upon completion of the tasks, SDDC configuration agents 220 return results to coordinator 150 through the cloud inbound connections. SDDC configuration agents 220 also notify coordinator 150 of various events through the cloud inbound connections, and coordinator 150 in turn posts these events to SDDC event dispatcher service 142 for handling by SDDC configuration worker service 140.

SDDC profile manager service 160 is responsible for storing the desired state documents in data store 165 (e.g., a virtual disk or a depot accessible using a URL) and, for each of SDDCs 20, tracks the history of the desired state document associated therewith and any changes from its desired state specified in the desired state document, e.g., using a relational database (hereinafter referred to as "desired state tracking database"). When SDDC configuration worker service 140 processes children activities associated with an operation to apply the desired state to SDDCs 20, SDDC configuration worker service 140 calls SDDC profile manager service 160 to store the desired state document in data store 165 and to update the desired state tracking database to record what (e.g., which desired state document) is being applied to where (e.g., to which SDDC) and when (e.g., date and time). Similarly, when SDDC configuration agent 220 of an SDDC notifies coordinator 150 of a change event or a drift event, and coordinator 150 posts the change or drift event to SDDC event dispatcher service 142, SDDC configuration worker service 140 calls SDDC profile manager service 160 to update the desired state tracking database to record what (e.g., which desired state document of which SDDC) has changed and when (e.g., date and time). Thereafter, SDDC profile manager service 160 posts notifications about any changes made to the desired state tracking database to notification service 170, and the administrator can get such notifications through UI/API 101.

An operation requested in the commands made through UI/API 101 may be synchronous, instead of asynchronous. An operation is synchronous if there is a specific time window within which the operation must be completed. Examples of a synchronous operation include an operation to get the desired state of an SDDC or an operation to get SDDCs that are associated with a particular desired state. In the embodiments, to enable such operations to be completed within the specific time window, SDDC configuration interface endpoint service 120 has direct access to data store 165.

As described above, a plurality of SDDCs 20, which may be of different types and which may be deployed across different geographical regions, is managed through cloud control plane 110. In one example, one of SDDCs 20 is deployed in a private data center of the customer and another one of SDDCs 20 is deployed in a public cloud, and all of SDDCs are located in different geographical regions so that they would not be subject to the same natural disasters, such as hurricanes, fires, and earthquakes.

Any of the services of described above (and below) may be a microservice that is implemented as a container image executed on the virtual infrastructure of public cloud 10. In one embodiment, each of the services described above is implemented as one or more container images running within a Kubernetes® pod.

In each SDDC 20, regardless of its type and location, a gateway appliance 210 and virtual infrastructure management (VIM) appliance 230 are provisioned from the virtual resources of SDDC 20. Gateway appliance 210 is able to establish connections with cloud control plane 110 and a local control plane of SDDC 20. In particular, SDDC configuration agent 220 running in gateway appliance 210 communicates with coordinator 150 to retrieve the tasks (e.g., various SDDC configuration actions, such as check compliance against desired state and apply desired state) that were dispatched to coordinator 150 for execution in SDDC 20 and delegates the tasks to SDDC configuration service 225 running in VIM server appliance 230. After the execution of these tasks have completed, SDDC configuration agent 220 sends back the execution result to coordinator 150.

SDDC configuration service 225 is responsible for passing on the tasks delegated by SDDC configuration agent 220 to the local control plane of SDDC 20, which includes a virtual infrastructure (VI) profiles manager 234. VI profiles manager 234 is responsible for applying the desired configuration of the virtual infrastructure managed by VIM server appliance 230 (e.g., the number of clusters, the hosts that each cluster would manage, etc.) and the desired configuration of various features provided by software products running in VIM server appliance 230 (e.g., distributed resource scheduling, high availability, and workload control plane), according to the desired state.

In the embodiments, the desired state of SDDC 20 also includes inventory data of SDDC 20, which is managed by directory service 250 of VIM server appliance 230. Directory service 250 stores the inventory data in a database 251, e.g., a key-value database, and the inventory data in database 251 is replicated across all SDDCs 20 when inventories of all SDDCs 20 are to be managed from a single user interface (e.g., UI/API 201 of any one of SDDCs 20). The inventory data includes user data, tag data, look-up service (LS) data, and certificate data.

The desired state of SDDC 20 is defined in a desired state document stored locally in data store 226 (e.g., virtual disk). The desired state document is retrieved by SDDC configuration agent 220 from coordinator 150 along with a task that requires the desired state document (e.g., a task to apply the desired state). FIG. 2 illustrates a condensed version of a sample desired state document in JSON format that includes fields for inventory data.

The desired state defined in the desired state document may be changed by the administrator of SDDCs 20 through UI/API 201. If the desired state is changed by the administrator of SDDCs 20 through UI/API 201, a change document that contains the changes to the desired state document stored in data store 226 is created and stored locally in data store 226. Thereafter, SDDC configuration agent 220 sends the change document to coordinator 150 along with a notification of this change event, i.e., that "a local change has been made to the desired state of an SDDC."

Figure 3:
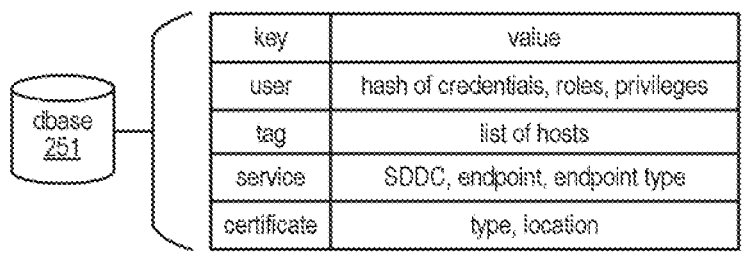
FIG. 3 depicts the types of information that are stored in database for the inventory data.

FIG. 3 depicts the different types of information that are stored in database 251 for each of user data, tag data, LS data, and certificate data. User data is stored in database 251 as a plurality of entries, one for each user, and each entry for a user contains the following information for the user: hash of credentials, roles, and privileges. Tag data is stored in database 251 as a plurality of entries, one for each tag, and each entry for a tag contains a list of hosts (in particular, host IDs) associated with the tag. LS data is stored in database 251 as a plurality of entries, one for each service, and each entry for a service contains the following information for the service: SDDC where the service is deployed, endpoint of the service, and the endpoint type. Certificate data is stored in database 251 as a plurality of entries, one for each certificate, and each entry for a certificate contains the following information for the certificate: type of certificate and location where the certificate is stored.

In the embodiments, inventories of all SDDCs 20 are managed from a single user interface. Therefore, the inventory data stored in database 251 is replicated across all SDDCs 20. As a result, user access to any of SDDCs 20 will be governed by the same user data regardless of which SDDC that the user accesses. In addition, hosts that are located in different SDDCs can be managed as a single cluster as long as they are tagged with the same cluster ID, and a service in one SDDC can call a service in another SDDC by performing a look-up of LS data. Similarly, certificate data in one of SDDCs 20 are shared with other SDDCs 20 so that a secure communication can be established with all SDDCs 20 using the certificate data stored in database 251 and replicated across all SDDCs 20.

Updates to database 251 are made by service plug-ins installed in VI profiles manager 234. In particular, user data, tag data, LS data, and certificate data in database 251 are updated by user plug-in 261, tag plug-in 262, LS plug-in 263, and certificate plug-in 264, respectively. Upon updating database 251, these plug-ins notify auto-change detection service 260 running in VI profiles manager 234. Auto-change detection service 260 transmits these changes to SDDC configuration service 225. In response, SDDC configuration service 225 commits these changes to the desired state document stored in data store 226, generates a change document that contains these changes, and notifies SDDC configuration agent 220, which in turn sends a notification of a change event and the change document to coordinator 150 of cloud control plane 110.

Figure 4:
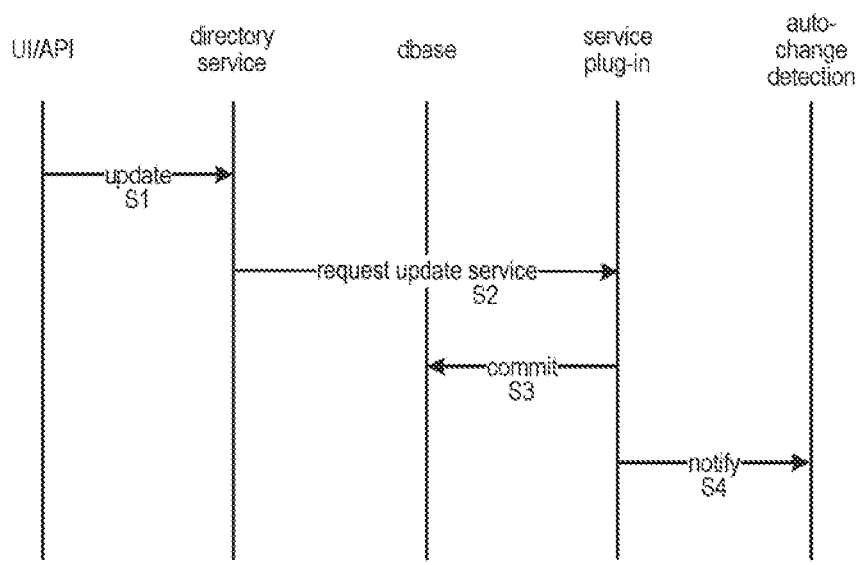
FIG. 4 depicts a sequence of commands that are issued and executed in response to an update to the database.

FIG. 4 depicts a sequence of commands that are issued and executed in response to an update to database 251 that is initiated through UI/API 201. At step S1, in response to user inputs made through UI/API 201, which contain desired changes to database 251, an update command is issued to directory service 250. Directory service 250 then calls the service plug-in(s) corresponding to the desired changes at step S2. For example, if tag data is being updated, directory service 250 calls tag plug-in 262. The corresponding service plug-in at step S3 commits the changes to database 251, and at step S4 notifies auto-change detection service 260 of the changes made to database 251.

Figure 6:
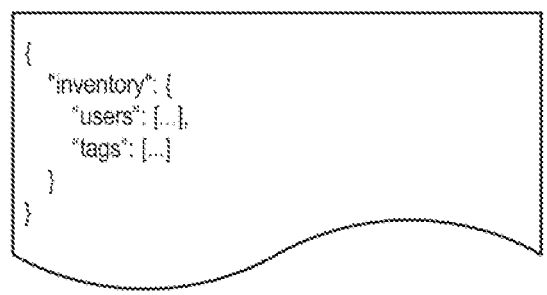
FIG. 6 illustrates a condensed version of a sample change document.
Figure 5:
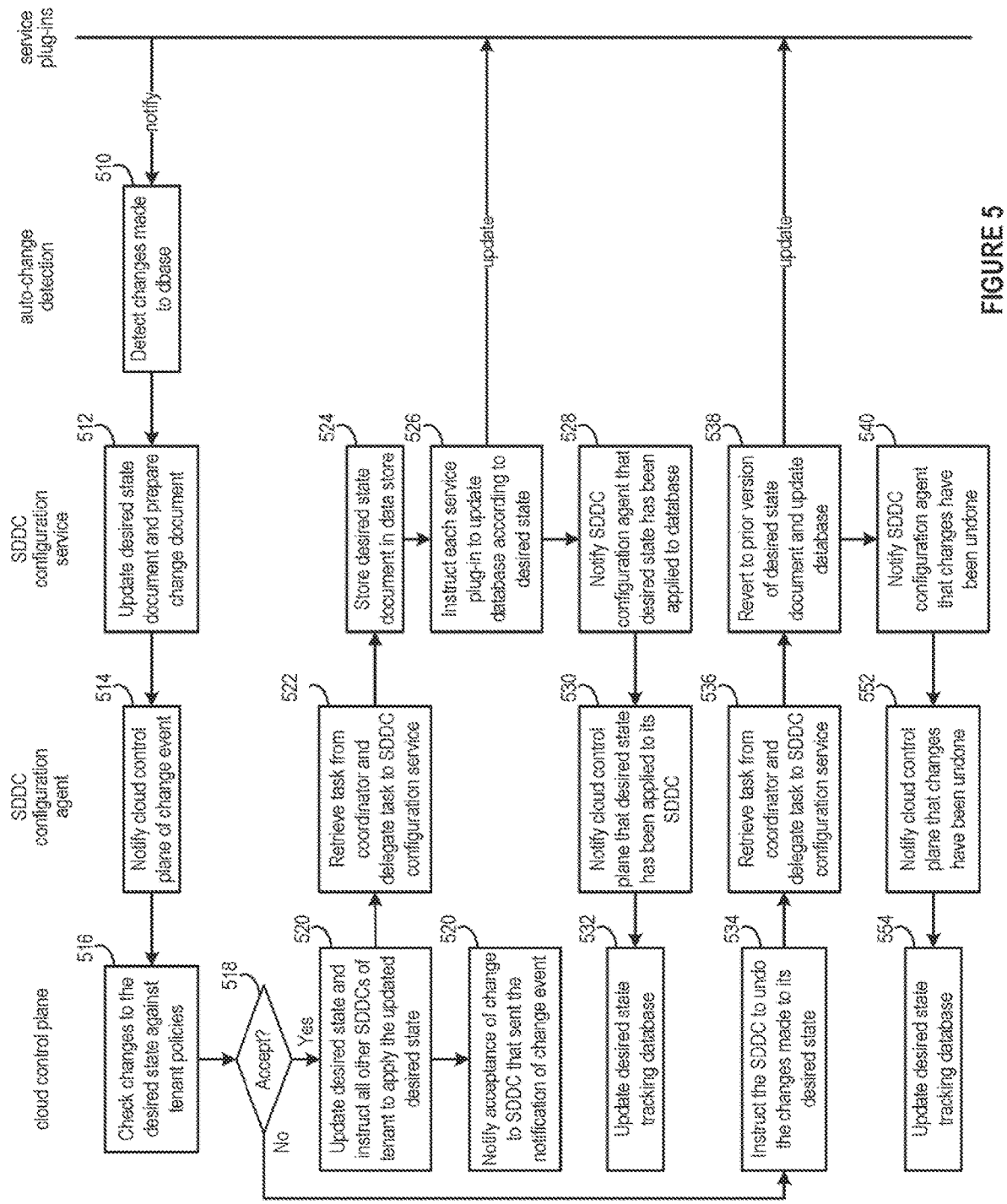
FIG. 5 is a flow diagram that illustrates a series of steps that are carried out in response to an update to the database.

FIG. 5 is a flow diagram that illustrates a series of steps that are carried out locally at SDDC 20 and a series of steps that are carried out by cloud control plane 110 in response to an update made to database 251. At step 510, auto-change detection service 260 detects changes made to database 251 as a result of a notification from any of the service plug-ins. Upon detecting the changes, auto-change detection service 260 notifies SDDC configuration service 225, which at step 512, applies the changes to the desired state, updates the desired state document stored in data store 226, prepares the change document, and transmits the change document to SDDC configuration agent 220. FIG. 6 illustrates a condensed version of a sample change document in JSON format. The change document illustrated in FIG. 6 assumes that the only changes to the desired state document are to two fields for inventory data, users and tags. The changes are represented by ellipsis in FIG. 6.

At step 514, SDDC configuration agent 220 sends a notification of the change event to cloud control plane 110 along with the change document. In response, cloud control plane 110, in particular SDDC configuration worker service 140, executes steps 516 and 518 to determine whether or not the changes should be accepted. To make this determination, SDDC configuration worker service 140 consults remediation rules of the tenant associated with SDDC 20 that sent the notification of the change event. These remediation rules are stored in data store 165 and retrieved from data store 165 when performing steps 516 and 518 (e.g., by calling SDDC profile manager service 160). In one embodiment, the remediation rules are used to resolve conflicting writes. For example, if cloud control plane 110 is notified of conflicting updates from different SDDCs of the same tenant, the remediation rules are applied to accept one of the updates and to reject the other updates.

If the updates from SDDC 20 are accepted, at step 520, SDDC configuration worker service 140 updates the desired state and instructs SDDC task dispatcher service 141 to dispatch the task of applying the updated desired state to all of the other SDDCs of the tenant to coordinator 150. Also, at step 521, SDDC configuration worker service 140 instructs SDDC task dispatcher service 141 to dispatch the task of notifying SDDC 20 that sent the notification of the change event that the updates have been accepted.

At step 522, each of SDDC configuration agents 220 running in the other SDDCs retrieves the dispatched task from coordinator 150 along with the updated desired state document and delegates the task to SDDC configuration service 225. To carry out the delegated task, SDDC configuration service 225 stores the updated desired state document in data store 226 (step 524) and instructs each service plug-in of VIM server appliance 230 to update database 251 according to the updated desired state. Then, at step 528, SDDC configuration service 225 notifies SDDC configuration agent 220 that the updated desired state has been applied to database 251. In turn, at step 530, SDDC configuration agent 220 notifies cloud control plane 110 that the updated desired state has been applied to its SDDC. Upon receiving the notification from SDDC configuration agent 220 of any of the other SDDCs that the updated desired state has been applied to the SDDC, cloud control plane 110, in particular SDDC profile manager service 160, updates the desired state tracking database to record that the updated desired state has been applied to the SDDC and when. When all of the other SDDCs of the tenant has completed applying the updated desired state, replication of the inventory data stored in database 251 across all SDDCs of the tenant is complete.

If the updates from SDDC 20 are rejected, at step 534, SDDC configuration worker service 140 instructs SDDC task dispatcher service 141 to dispatch the task of undoing the changes made to the desired state in SDDC 20. At step 536, SDDC configuration agent 220 running in SDDC 20 retrieves the dispatched task from coordinator 150 and delegates the task to SDDC configuration service 225. To carry out the delegated task, SDDC configuration service 225 reverts to a prior version of the desired state and instructs each service plug-in of VIM server appliance 230 to update database 251 according to the prior version of the desired state (step 538). Then, at step 540, SDDC configuration service 225 notifies SDDC configuration agent 220 that the changes to the desired state have been undone. In turn, at step 552, SDDC configuration agent 220 notifies cloud control plane 110 that the changes to the desired state have been undone. Upon receiving the notification from SDDC configuration agent 220 of SDDC 20 that the changes to the desired state have been undone, cloud control plane 110, in particular SDDC profile manager service 160, updates the desired state tracking database to record that the changes to the desired state of SDDC 20 have been undone and when.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of managing the sharing of inventory data across a plurality of data centers from a cloud platform so that user access to inventory data stored locally in any of the data centers will be governed by the same inventory data regardless of which data center the user accesses, wherein each of the data centers includes a virtual infrastructure management appliance having a service running therein for storing the inventory data locally in a database and detecting a local change to the inventory data, said method comprising:

receiving by a cloud service running in the cloud platform a notification from one of the data centers that a change has been made to the inventory data stored locally in the database of said one of the data centers;

in response to the notification, updating by the cloud service a desired state document that specifies a desired state of each of the data centers and has been applied to the data centers by the virtual infrastructure management appliances thereof, the updated desired state document including the inventory data as changed; and issuing a command by the cloud service to a virtual infrastructure management appliance of each of other ones of the data centers to apply the updated desired state document, wherein the applying of the updated desired state document by the virtual infrastructure management appliance of each of the other ones of the data centers causes the inventory data stored locally in the database of each of the other ones of the data centers to be updated to include the change made to the inventory data.

2. The method of claim 1, wherein the desired state document is stored in association with a first tenant and another desired state document that specifies a desired state of each of another plurality of data centers of a second tenant is stored in association with the second tenant.

3. The method of claim 2, further comprising:
after receiving notification of the change and prior to updating the desired state document, checking the change against remediation rules of the first tenant to determine whether or not the change is allowed under the remediation rules of the first tenant.

4. The method of claim 3, wherein the command is issued to the virtual infrastructure management appliance of each of other ones of the data centers, upon determining that the change is allowed.

5. The method of claim 4, further comprising:
notifying the data center that made the change to the inventory data that the change has been accepted, upon determining that the change is allowed.

6. The method of claim 3, wherein
if a change is made to the inventory data by a data center of the first tenant and the change is not allowed under the remediation rules of the first tenant, the first data center is notified that the change has not been accepted and instructed to undo the change.

7. The method of claim 1, wherein the data centers are each a software-defined data center and configurations of the data centers are managed from a cloud services platform.

8. A non-transitory computer readable medium comprising instructions to be executed in a computer system to carry out a method of managing the sharing of inventory data across a plurality of data centers from a cloud platform so that user access to inventory data stored locally in any of the data centers will be governed by the same inventory data regardless of which data center the user accesses, wherein each of the data centers includes a virtual infrastructure management appliance having a service running therein for storing the inventory data locally in a database and detecting a local change to the inventory data, said method comprising:

receiving by a cloud service running in the cloud platform a notification from one of the data centers that a change has been made to the inventory data stored locally in the database of said one of the data centers;

in response to the notification, updating by the cloud service a desired state document that specifies a desired state of each of the data centers and has been applied to the data centers by the virtual infrastructure management appliances thereof, the updated desired state document including the inventory data as changed; and issuing a command by the cloud service to a virtual infrastructure management appliance of each of other ones of the data centers to apply the updated desired state document, wherein the applying of the updated desired state document by the virtual infrastructure management appliance of each of the other ones of the data centers causes the inventory data stored locally in the database of each of the other ones of the data centers to be updated to include the change made to the inventory data.

9. The non-transitory computer readable medium of claim 8, wherein the desired state document is stored in association with a first tenant and another desired state document that specifies a desired state of each of another plurality of data centers of a second tenant is stored in association with the second tenant.

10. The non-transitory computer readable medium of claim 9, wherein the method further comprises:
after receiving notification of the change and prior to updating the desired state document, checking the change against remediation rules of the first tenant to determine whether or not the change is allowed under the remediation rules of the first tenant.

11. The non-transitory computer readable medium of claim 10, wherein the command is issued to the virtual infrastructure management appliance of each of other ones of the data centers, upon determining that the change is allowed.

12. The non-transitory computer readable medium of claim 11, wherein the method further comprises:
notifying the data center that made the change to the inventory data that the change has been accepted, upon determining that the change is allowed.

13. The non-transitory computer readable medium of claim 10, wherein
if a change is made to the inventory data by a data center of the first tenant and the change is not allowed under the remediation rules of the first tenant, the first data center is notified that the change has not been accepted and instructed to undo the change.

14. A cloud services portal deployed in a computer system to manage the sharing of inventory data across a plurality of data centers so that user access to inventory data stored locally in any of the data centers will be governed by the same inventory data regardless of which data center the user accesses, wherein each of the data centers includes a virtual infrastructure management appliance having a service running therein for storing the inventory data locally in a database and detecting a local change to the inventory data, wherein the cloud services portal includes a processor that is programmed to carry out the steps of:

receiving by a cloud service running in the cloud platform a notification from one of the data centers that a change has been made to the inventory data stored locally in the database of said one of the data centers;

in response to the notification, updating by the cloud service a desired state document that specifies a desired state of each of the data centers and has been applied to the data centers by the virtual infrastructure management appliances thereof, the updated desired state document including the inventory data as changed; and issuing a command by the cloud service to a virtual infrastructure management appliance of each of other ones of the data centers to apply the updated desired state document, wherein the applying of the updated desired state document by the virtual infrastructure management appliance of each of the other ones of the data centers causes the inventory data stored locally in the database of each of the other ones of the data centers to be updated to include the change made to the inventory data.

15. The cloud services portal of claim 14, wherein the desired state document is stored in association with a first tenant and another desired state document that specifies a desired state of each of another plurality of data centers of a second tenant is stored in association with the second tenant.

16. The cloud services portal of claim 15, wherein the steps further include:

after receiving notification of the change and prior to updating the desired state document, checking the change against remediation rules of the first tenant to determine whether or not the change is allowed under the remediation rules of the first tenant.

17. The cloud services portal of claim 16, wherein the command is issued to the virtual infrastructure management appliance of each of other ones of the data centers, upon determining that the change is allowed.

18. The cloud services portal of claim 17, wherein the steps further include:

notifying the data center that made the change to the inventory data that the change has been accepted, upon determining that the change is allowed.

19. The cloud services portal of claim 16, wherein if a change is made to the inventory data by a data center of the first tenant and the change is not allowed under the remediation rules of the first tenant, the first data center is notified that the change has not been accepted and instructed to undo the change.

\* \* \* \* \*